US012735932B2

(12) United States Patent
Thomas, Jr.

(10) Patent No.: US 12,735,932 B2
(45) Date of Patent: Sep. 15, 2026

(54) CABLE DRUM CABLE TENSIONER AND METHODS IN A MOVABLE BARRIER SYSTEM

(71) Applicant: GMI Holdings, Inc., Mt. Hope, OH (US)

(72) Inventor: Robert E. Thomas, Jr., Flower Mound, TX (US)

(73) Assignee: GMI Holdings, Inc., Mt. Hope, OH (US)

( * ) Notice: Subject to any disclaimer, the term of this patent is extended or adjusted under 35 U.S.C. 154(b) by 0 days.

(21) Appl. No.: 18/760,936

(22) Filed: Jul. 1, 2024

(65) Prior Publication Data

US 2026/0002399 A1 Jan. 1, 2026

(51) Int. Cl.
*E05F 15/41* (2015.01)
*E05F 15/686* (2015.01)

(52) U.S. Cl.
CPC ............ *E05F 15/41* (2015.01); *E05F 15/686* (2015.01); *E05Y 2900/106* (2013.01)

(58) Field of Classification Search
CPC .............. E05F 15/40–41; E05F 15/686; E06B 2009/6836; E06B 2009/6854; E06B 2009/6845; E05Y 2900/106; E05D 13/1215
See application file for complete search history.

(56) References Cited

U.S. PATENT DOCUMENTS 2,855,162 A 10/1958 Schacht, Jr.
3,412,423 A * 11/1968 Binns .................. E05D 13/1261 49/200
3,412,780 A 11/1968 Moler
3,474,317 A * 10/1969 Delaney .................... H02P 7/03 318/266
3,955,661 A * 5/1976 Popper .................... F16H 13/08 475/158
4,191,237 A * 3/1980 Voege ................... E05F 15/686 160/188
5,170,108 A * 12/1992 Peterson ............... E05F 15/603 160/84.02
5,636,678 A * 6/1997 Carper ...................... F16F 1/14 16/DIG. 7

(Continued)

FOREIGN PATENT DOCUMENTS

CA 607582 A 10/1960
CN 1054570 A * 9/1991 ......... B65H 54/2851

(Continued)

*Primary Examiner* — Daniel P Cahn
*Assistant Examiner* — Patrick B. Ponciano
(74) *Attorney, Agent, or Firm* — Haynes and Boone, LLP

(57) ABSTRACT

A movable barrier system for operating a movable barrier may include a torsion tube configured to rotate and a cable drum comprising a cable connectable to the movable barrier. The cable drum may be configured to rotate relative to the torsion tube. The movable barrier system may further include a sensor configured to detect the angular displacement or a force between the torsion tube and the cabled drum and send a signal when the angular displacement or the force changes. The movable barrier system may further include a controller in communication with the sensor and configured to stop rotation of the torsion tube in response to the signal.

20 Claims, 7 Drawing Sheets

(56) References Cited

U.S. PATENT DOCUMENTS

| | | | | | |
|---|---|---|---|---|---|
| 5,960,849 | A * | 10/1999 | Delaney | E05F 15/681 254/270 |
| 6,326,751 | B1 * | 12/2001 | Mullet | E05F 15/686 318/434 |
| 6,381,903 | B1 * | 5/2002 | Desrochers | E06B 9/74 160/310 |
| 6,883,579 | B2 * | 4/2005 | Olmsted | E05F 15/686 160/209 |
| 7,207,142 | B2 * | 4/2007 | Mullet | E05F 15/668 340/686.1 |
| 7,481,133 | B2 * | 1/2009 | Walravens | E05F 15/603 49/140 |
| 7,576,504 | B2 * | 8/2009 | Mullet | E05F 15/668 318/602 |
| 7,635,017 | B2 | 12/2009 | Bennett, III | |
| 9,341,022 | B2 * | 5/2016 | Nicholson | E05F 15/684 |
| 9,399,888 | B2 * | 7/2016 | Colson | E06B 9/42 |
| 9,599,996 | B2 * | 3/2017 | Lagarde | E05F 15/70 |
| 9,840,869 | B2 * | 12/2017 | Bogataj | E05F 15/686 |
| 10,000,960 | B2 * | 6/2018 | Angiuli | E05F 15/40 |
| 10,358,317 | B2 * | 7/2019 | Laird | B65H 75/4484 |
| 11,851,936 | B2 * | 12/2023 | Cate | E06B 9/68 |
| 11,913,272 | B2 * | 2/2024 | Hsieh | E05F 15/686 |
| 11,970,899 | B2 * | 4/2024 | Hall | E05F 15/73 |
| 2005/0217806 | A1 * | 10/2005 | Bruno | E05F 15/668 160/189 |
| 2010/0280666 | A1 * | 11/2010 | Marchetto | E04F 10/0659 700/275 |
| 2024/0159096 | A1 * | 5/2024 | Seadia | E06B 9/90 |
| 2024/0291349 | A1 * | 8/2024 | Goelz | H02P 3/04 |

FOREIGN PATENT DOCUMENTS

| | | | | | |
|---|---|---|---|---|---|
| CN | 107923211 | B | * | 10/2021 | E05F 3/16 |
| GB | 1322744 | A | | 7/1973 | |
| SE | 465969 | B | * | 11/1991 | E05D 13/003 |
| WO | WO-2025023882 | A1 | * | 1/2025 | E05D 13/003 |

* cited by examiner

CABLE DRUM CABLE TENSIONER AND METHODS IN A MOVABLE BARRIER SYSTEM

TECHNICAL FIELD

The present disclosure relates generally to movable barrier systems for opening and closing garage doors, gates, and other moveable barriers, and more particularly to cable drum cable tensioner systems, devices, and methods for detecting and/or preventing a slack cable in a movable barrier system.

BACKGROUND

Movable barriers, such as a garage doors, sometimes utilize cables that connect the barrier to a torsion tube. When the barrier fails to close properly (for example, due to an obstruction, a jam, tilting, and/or dislodgement from guide rails) the cable may become slack. This can happen when a motor continues to rotate the torsion tube, but the door is not moving. A slack cable may generally cause a number of problems such as door position issues or wear on the movable barrier system and can even render the movable barrier system inoperable. In an example, the slack cable may cause a movable barrier to close suddenly and quickly potentially causing structural damage and/or injury. Additional mechanical issues may result from attempts to fix and/or repair the resulting slack cable. Thus, there remains a need for effective ways to detect and/or prevent a slack cable in a movable barrier system.

SUMMARY

Embodiments of the present disclosure include systems, devices, and methods of detecting and/or preventing a slack cable in a movable barrier system.

In some examples, a movable barrier system for operating a movable barrier may include a torsion tube configured to rotate. The movable barrier system may further include a cable drum on the torsion tube and comprising a cable connectable to the movable barrier, the cable drum configured to rotate relative to the torsion tube. The movable barrier system may further include a sensor configured to detect an angular displacement or a force between the torsion tube and the cable drum and send a signal when the angular displacement or the force changes. The movable barrier system may further include a controller in communication with the sensor and configured to stop rotation of the torsion tube in response to the signal.

In some examples, a movable barrier system for operating a movable barrier may include a torsion tube configured to rotate in a first direction. The movable barrier system may further include a cable drum comprising a cable connectable to the movable barrier, the cable drum configured to rotate in the first direction and a second direction and configured to rotate relative to the torsion tube in a manner that changes an angular displacement between the torsion tube and the cable drum. The movable barrier system may further include a displacement coupler configured to oppose rotation of the cable drum in the second direction when the cable drum pivots relative to the torsion tube. The movable barrier system may further include a sensor configured to communicate a signal to a controller when the angular displacement or a force changes.

In some examples, a method for operating a movable barrier in a movable barrier system may include providing a torsion tube and a cable drum. The method may further include rotating the torsion tube and the cable drum in a first direction with an about equal angular velocity. The method may further include decreasing the angular velocity of the cable drum in a manner that an angular displacement between the torsion tube and the cable drum increases. The method may further include selectively communicating a signal from a sensor to a controller to stop movement of the movable barrier when the angular displacement reaches a threshold.

Additional aspects, features, and advantages of the present disclosure will become apparent from the following detailed description.

BRIEF DESCRIPTION OF THE DRAWINGS

The accompanying drawing figures incorporated in and forming a part of this specification illustrate several aspects of the disclosure, and together with the description, serve to explain the principles of the disclosure.

DETAILED DESCRIPTION

Figure 1:
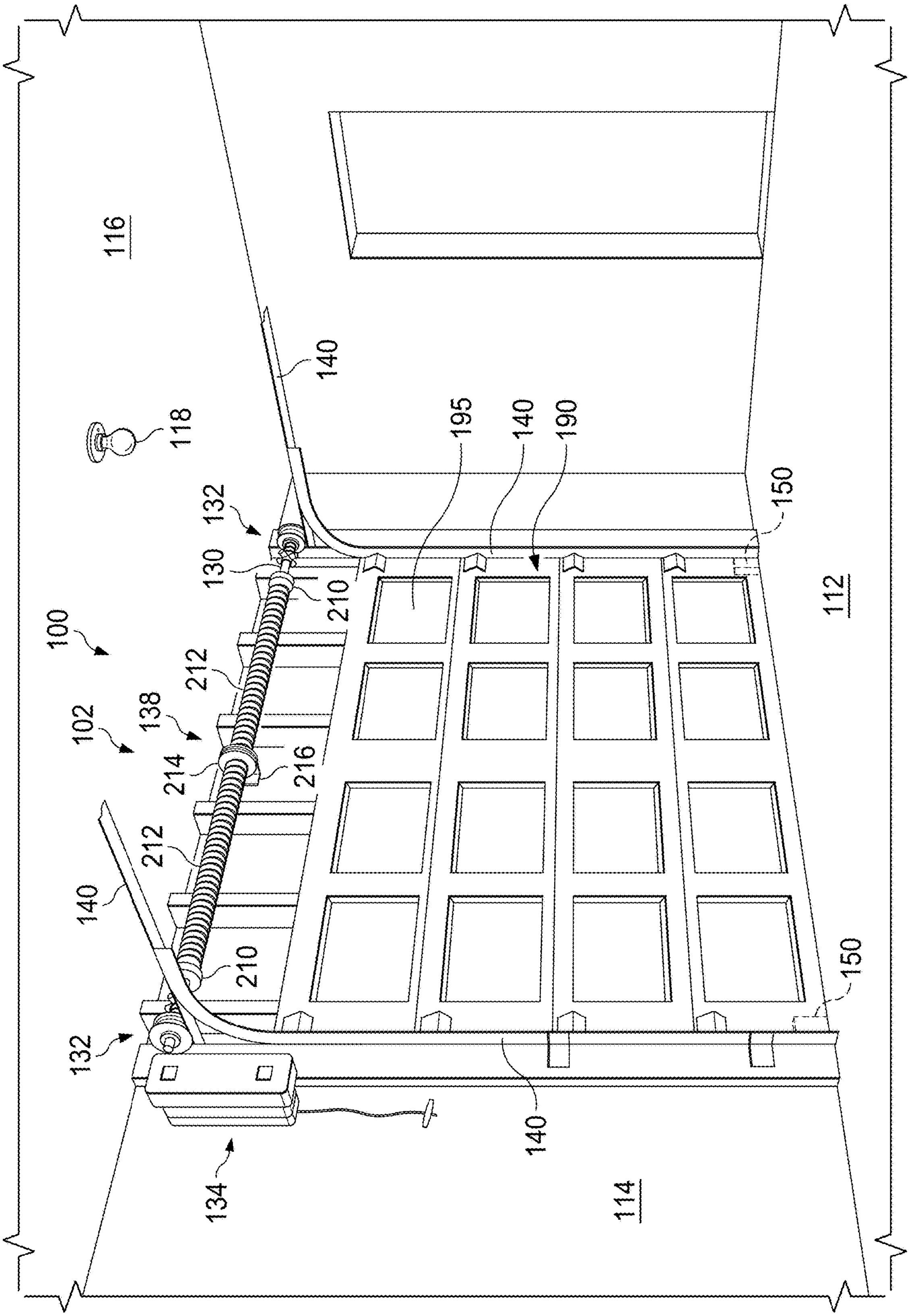
FIG. 1 is a perspective view of an example movable barrier system, according to some aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Disclosed herein are systems, methods, and devices for detecting and/or preventing a slack cable in a movable barrier system. In some implementations, it does this by allowing for angular displacement between a torsion tube and a cable drum. Thus, the present disclosure may allow a barrier operator system to detect and/or prevent a slack cable when the movable barrier becomes obstructed, jams, tilts, and/or dislodges from guide rails, thereby increasing predictability, durability, and operability.

In conventional door operator systems, a cable drum is typically locked to a torsion tube such that the cable drum and the torsion tube rotate at the same angular displacement. If the barrier becomes obstructed, jams, tilts, or dislodges from the guide rail, the cable, which is connected to the barrier, may stop moving downwardly while the cable drum and the torsion tube continue to rotate. This can potentially cause some of the cable to come off the cable drum and become slack, resulting in the challenges described herein. Additional problems may result from attempts to fix and/or repair the resulting slack cable.

In some implementations, the disclosed system, device, and/or method may act as a counterbalance system and allow for detection and/or prevention of a slack cable in a barrier operator system by allowing for angular displacement between a torsion tube and a cable drum. Angular displacement may be defined in some implementations as the total rotation angle of a rotating object from a fixed reference point. Angular displacement may be measured in degrees or radians, depending on the implementation. In some implementations, a torsion tube and cable drum will rotate at the same angular displacement due to a mechanical limit configured between the torsion tube and the cable drum. Once reached, the mechanical limit may prevent the cable drum from rotating freely in one direction relative to the torsion tube. If a movable barrier becomes obstructed, jams, tilts, or dislodges from the guide rails, the cable may stop moving downwardly causing the cable drum to stop or slow rotation. As the cable drum stops or slows rotation, the torsion tube may continue to rotate causing the angular displacement between the cable drum and the torsion tube to increase. In some implementations, the movable barrier system may include at least one sensor to detect when angular displacement reaches a certain threshold value and communicate to the controller to stop the rotation of the torsion tube. In some implementations, a displacement coupler, such as a spring, may resist the cable drum from rotating in a direction opposite the torsion tube which may cause a slack cable. Thus, the ability to allow changes in the angular displacement between the cable drum and the torsion tube may allow for the detection and prevention of a slack cable. Further, in some implementations, the ability to allow changes in the angular displacement between the cable drum and the torsion tube may allow for mechanical adjustment of the movable barrier system during installation and/or set up.

FIG. 1 is a perspective view of an example movable barrier system 100, according to some aspects of the present disclosure. FIG. 1 illustrates a movable barrier 190 and a barrier operator 134. In this example, the movable barrier 190 may be an upward acting garage door. In some examples, the movable barrier 190 may be a sectional-type garage door. The movable barrier 190 may include various panels including opaque, transparent, or semi-transparent panels.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 134 may alternatively be referred to as an operator, a door operator, a garage door operator, a gate operator, an opener, a door opener, a garage door opener, a gate opener, a control system, or any other similar term.

FIG. 1 shows that the movable barrier 190 provides access to a space or a room having a floor 112. The movable barrier 190 may provide selective access to the space. In the closed position shown in FIG. 1, the movable barrier 190 may be positioned within an opening of a wall, such as wall 114. The barrier operator 134 may be any suitable type of barrier operator. For example, in some implementations, the barrier operator 134 may be a jackshaft operator. In other implementations, the barrier operator 134 may be a trolley operator, a direct drive wall or ceiling mounted operator, a belt driven operator, a chain driven operator, a screw drive operator, and/or any other type of barrier operator. The barrier operator 134 may include any suitable components. As shown in FIG. 1, the barrier operator 134 may be disposed adjacent to the movable barrier 190. For example, in the implementation shown, the barrier operator 134 may be positioned on the wall 114. However, the barrier operator 134 may be positioned at any other location within the room shown in FIG. 1. For example, the barrier operator 134 may be affixed to the ceiling 116. In some implementations, the barrier operator 134 may be positioned on a different wall of the room or on the floor 112 of the room. In some implementations, particularly in an implementation in which the barrier operator 134 is affixed or otherwise positioned on the ceiling 116 of the room, the light fixture 118 shown may be attached to, or a part of, the barrier operator 134.

In the example shown in FIG. 1, the movable barrier system 100 may be configured such that the barrier operator 134 is a jackshaft operator. When the barrier operator 134 is a jackshaft operator, the movable barrier system 100 described herein may be configured to detect and signal that a cable has gone slack due to a number of reasons, such as due to the movable barrier 190 hitting an obstruction, due to the movable barrier 190 not closing, due to unequal tensioning between a left cable and a right cable, and/or due to the movable barrier 190 coming off the guide rails 140. In some implementations, the movable barrier system 100 may be configured such that the barrier operator is a trolley operator. In a trolley operator configuration, a torsion tube 130 will generally not be rotated by a motor, instead being rotated by the weight of the movable barrier 190. Thus, when the barrier operator 134 is a trolley operator, the movable barrier system 100 described herein may be configured to detect and signal that a cable has gone slack due to a number of reasons, such as due to unequal tensioning between a left cable and a right cable and/or due to the movable barrier 190 coming off the guide rails 140.

Any suitable structures or components may be implemented to facilitate movement of the movable barrier 190 between a closed position and an open position. In the example shown in FIG. 1, the movable barrier 190 may be moved along one or more rails 140.

FIG. 1 illustrates the movable barrier 190 as an upward acting sectional door being movable between open and closed positions along the rails 140. Rails 140 may be affixed to either side of the opening of the movable barrier 190. In some implementations, the rails 140 may be affixed to the wall 114 shown in FIG. 1 and/or the ceiling 116. In some implementations, the movable barrier 190 may include one or more rolling or sliding components on either side sized and shaped to fit within and move in a longitudinal direction along the rails 140. The rolling or sliding components may be affixed to brackets positioned on either side of the movable barrier 190.

Components of the movable barrier system 100 shown in FIG. 1 may include any other suitable components. For example, the movable barrier system 100 may include rollers positioned on the movable barrier 190 or the rails 140. The movable barrier system 100 may include additional sensors, such as safety sensors able to detect the presence or motion of an object or person and/or seals positioned along any portion of the movable barrier 190 or the corresponding opening, rails, cables, and/or tube shafts. The system may include extension springs to further reduce necessary rotational force of a motor, a motor rail, belts, motor head, motor arms, lift handles for manual operation, emergency release ropes, and/or any other suitable components.

In some implementations, the movable barrier system 100 may additionally include a torsion bar assembly 102. The torsion bar assembly 102 may include cable drum assemblies 132, a torsion tube 130, and a torsion spring assembly 138. The movable barrier system 100 may additionally include a cable (reference 308 in FIG. 3) attached to the cable drum assemblies 132 and connectors 150 which form a part of the movable barrier 190. In some implementations, the barrier operator 134 may include a motor or similar component which may automatically open and/or close the movable barrier 190 by rotating the torsion tube 130 in a first direction and/or in a second direction. It should be understood that as used herein, the term torsion tube 130 includes hollow tubes as well as solid shafts and bars.

Figure 2:
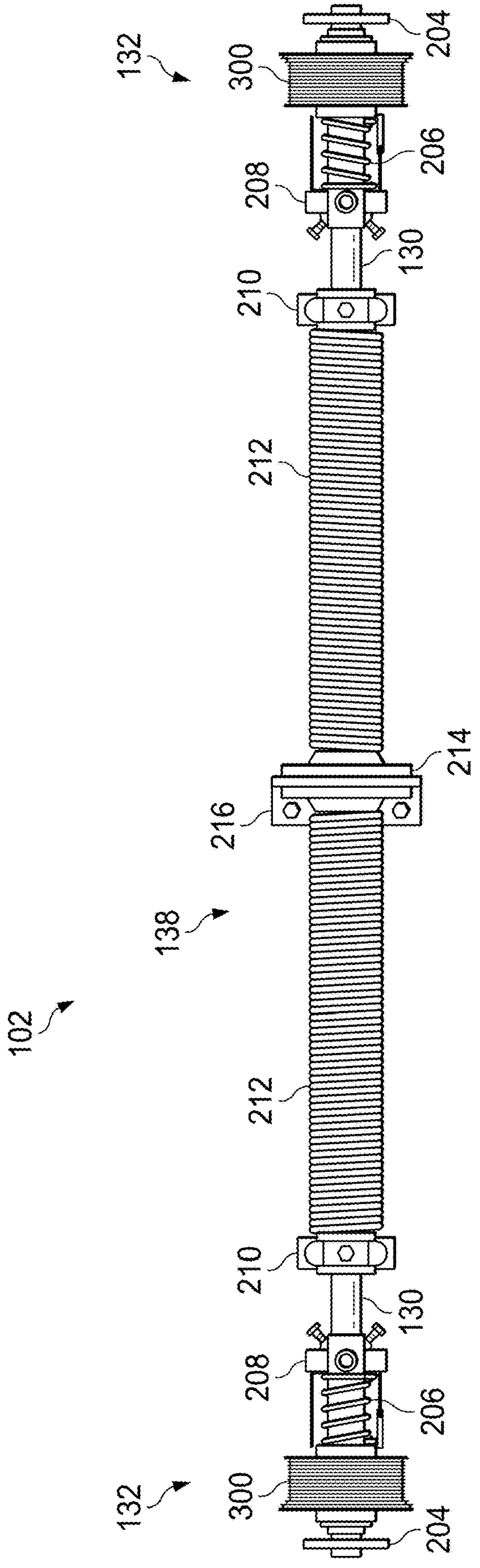
FIG. 2 is a front view of a torsion bar assembly, according to some aspects of the present disclosure.

FIG. 2 is a front view of torsion bar assembly 102, according to some aspects of the present disclosure. The torsion bar assembly 102 may include a torsion tube 130, bearing plates 204, cable drum assemblies 132, and a torsion spring assembly 138. The torsion spring assembly 138 may include winding cones 210, torsion springs 212, a stationary cone 214, and a center bearing plate 216. In some implementations, the torsion spring assembly 138 may reduce the energy to either automatically or manually lift the movable barrier 190. While the movable barrier 190 closes, the torsion springs 212 may wind and store potential energy which may be used to reduce the energy required to open the movable barrier 190. Winding cones 210 may be used to wind and compress the torsion springs 212 such that the torsion springs 212 reduce the force necessary to open the movable barrier 190. When the movable barrier 190 closes, the torsion springs 212 may wind and compress to store potential energy. When the movable barrier 190 opens, the torsion springs 212 may unwind and uncompress decreasing the force and energy required to open the movable barrier 190. A stationary cone 214 may prevent the torsion springs 212 from unwinding in one direction, allowing the winding cones 210 to wind the torsion springs 212. The stationary cones may be mounted to the wall 114 with a center bearing plate 216. The winding cones 210 may be coupled to the torsion tube 130 such that the winding cones 210 rotate at the same angular velocity as the torsion tube 130. Thus, as the torsion tube 130 rotates in a first direction, the winding cones 210 may also rotate in the first direction and the torsion springs 212 may wind. As the torsion tube 130 rotates in a second direction, the winding cones 210 may also rotate in the second direction and the torsion springs 212 may unwind. It should be understood that, in some implementations, one torsion spring may be used in the torsion spring assembly 138. Depending on the implementation, the torsion tube 130 may rotate automatically by a motor or other power source or may be rotated manually.

Figure 3:
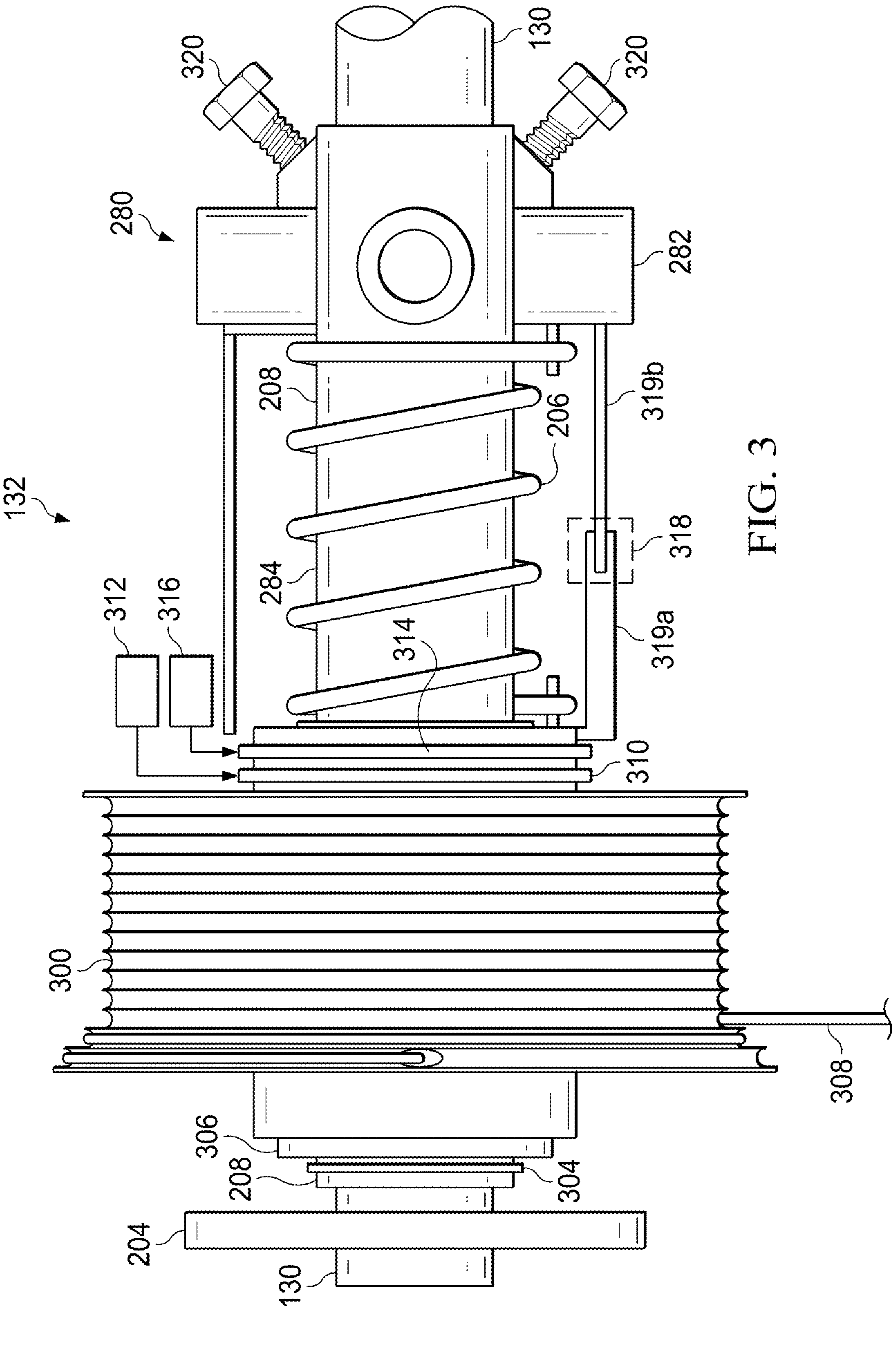
FIG. 3 is a front view of a cable drum assembly, according to some aspects of the present disclosure.

FIG. 3 is a front view of a cable drum assembly 132, according to some aspects of the present disclosure. A cable drum assembly 132 may include some or all of a cable drum 300, a torsion tube anchor assembly 280, a displacement coupler 206, a load sensor measurement track 310, a load sensor 312, a displacement measurement track 314, a displacement sensor 316, a mechanical limit 318, and at least one set screw 320.

In some implementations, the cable drum assembly 132 may detect a slack cable based on an angular displacement between the cable drum 300 and the torsion tube 130 and/or the torsion tube anchor assembly 280. The cable drum 300 may be positioned on the torsion tube 130 and/or the torsion tube anchor assembly 280 such that it may rotate freely relative to the torsion tube 130 and/or the torsion tube anchor assembly 280. The cable drum 300 may be equipped with sensors 312, 316 which may measure angular displacement and/or determine whether the cable is slack. Since the cable drum 300 may rotate freely relative to the torsion tube 130 and/or the torsion tube anchor assembly 280, when the movable barrier 190 initially begins closing, the cable drum 300, due to the weight of the cable, may rotate more quickly than the torsion tube 130 and/or the torsion tube anchor assembly 280 until a mechanical limit 318 is reached. The mechanical limit 318 may force the cable drum 300 to rotate at the same (i.e., equal or about equal) angular velocity as the torsion tube 130 and/or the torsion tube anchor assembly 280. However, if the movable barrier becomes obstructed, jams, tilts, and/or dislodge from the rails 140, an upward force from the cable may stop or slow rotation of the cable drum 300 causing an angular displacement between the cable drum 300 and the torsion tube 130 and/or the torsion tube anchor assembly 280 which continue to rotate. A displacement sensor 316 may be equipped to determine the angular displacement of between the stopped cable and the torsion tube 130 and/or the torsion tube anchor assembly 280 and may detect when a threshold value of angular velocity or rotational velocity is reached and/or exceeded which may indicate a slack cable.

In some implementations, the cable drum assembly 132 may comprise the displacement coupler 206 which may prevent the cable 308 from going slack. Since the cable drum 300 may rotate freely relative to the torsion tube 130 and/or the torsion tube anchor assembly 280, when the movable barrier 190 initially begins closing, the cable drum 300, due to the weight of the cable, may rotate more quickly than the torsion tube 130 and/or the torsion tube anchor assembly 280 until a mechanical limit 318 is reached. The displacement coupler 206 may be positioned between the cable drum 300 and the torsion tube anchor 208 such that the displacement coupler 206 may wind as the cable drum 300 rotates at a higher angular velocity than the torsion tube anchor assembly 280. If the movable barrier becomes obstructed, jams, tilts, and/or dislodge from the rails 140, an upward force from the cable may stop or slow rotation of the cable drum 300 causing an angular displacement between the cable drum 300 and the torsion tube 130 and/or the torsion tube anchor assembly 280 which continue to rotate. When the cable drum 300 stops or slows rotation, the displacement coupler 206 may apply a force to the cable drum 300 which may prevent the upward force of the cable 308 from going slack. In this implementation, the displacement coupler 206 may be a torsion spring extending between and connecting the torsion tube anchor assembly 280 and the cable drum 300.

In some implementations, the cable drum assembly 132 may comprise both the load sensor 312, the displacement sensor 316, and the displacement coupler 206, and the cable drum assembly 132 may be configured to both detect and prevent a slack cable as further described herein.

In the example shown in FIG. 3, the cable drum may be a residential four-inch standard-lift drum with an inner diameter (ID). However, it should be understood that the cable drum 300 may be interchangeable with any other type and/or size of cable drum. For example, in some implementations, the cable drum 300 may be any type of standard-lift drum. In some implementations, the cable drum 300 may be a standard-lift drum with an outer diameter of 4 inches. In some implementations, the cable drum 300 may be a standard-lift drum with an outer diameter of 4.5 inches. In some implementations, the cable drum 300 may be a standard-lift drum with an outer diameter of 3 to 5 inches. In some implementations, the cable drum 300 may have an inner diameter of more than 1 inch. In some implementations, the cable drum 300 may have an inner diameter of 1 inch. In some implementations, the cable drum 300 may have an inner diameter of 3 to 6 inches. That is, it should be understood that the outer diameter of the cable drum 300 may be any size and the inner diameter of the cable drum 300 may be any size. In some implementations, the inner diameter of the cable drum 300 may be greater than the outer diameter of the torsion tube 130 or at least one outer diameter of the torsion tube anchor assembly 280. Generally, a cable drum may have a relatively small inner diameter as the outer diameter of the torsion tube is typically relatively small. However, in some implementations, the cable drum 300 may have a relatively larger inner diameter such that the inner diameter of the cable drum 300 is larger than at least one outer diameter of the torsion tube anchor assembly 280. Thus, in some implementations, the cable drum 300 may be configured to rotate and/or pivot relative to at least a portion of the torsion tube anchor assembly 280 and/or the torsion tube 130.

In some implementations, the cable drum 300 may be a hi-lift drum. In some implementations, the cable drum 300 may be a vertical-lift drum. In some implementations, the cable drum may be configured to rotate and/or pivot relative to a bearing 306. In some implementations, the bearing 306 may allow the cable drum 300 to rotate and/or pivot about an outer diameter of the bearing 306 such that the cable drum may rotate clockwise and/or counterclockwise. In some implementations, the bearing 306 may be lubricated to allow for the cable drum 300 to rotate and/or pivot about the bearing 306 with less resistance. In some implementations, the cable drum may be configured to rotate and/or pivot relative to a torsion tube anchor 208. In some implementations, the torsion tube anchor 208 may allow the cable drum 300 to rotate and/or pivot about an outer diameter of the torsion tube anchor 208 such that the cable drum may rotate clockwise and/or counterclockwise. In some implementations, the torsion tube anchor 208 may be lubricated to allow for the cable drum 300 to rotate and/or pivot about the torsion tube anchor 208 with less resistance.

In some implementations, the cable drum 300 may be positioned in a similar position as a standard cable drum (e.g., about 1 inch from the bearing plate). In some implementations, a cable 308 may be spooled around the cable drum 300. In some implementations, one end of the cable 308 may be coupled with the cable drum 300. In some implementations, the cable 308 may remain spooled on the cable drum 300 due to the friction of the cable 308 on the cable drum 300. The cable 308 may attach to a portion of the movable barrier 190 (FIG. 1), such as the connectors 150 (FIG. 1). It should be understood that the cable 308 may be made of any suitable material, including, for example, metal, alloy, steel, and/or stainless steel.

In some implementations, a displacement measurement track 314 may be coupled to a portion of the cable drum 300. In some implementations, a displacement sensor 316 may be coupled to a portion of the cable drum 300 and/or the displacement measurement track 314. In some implementations, a load sensor measurement track 310 may be coupled to a portion of the cable drum 300. In some implementations, a load sensor 312 may be coupled to a portion of the cable drum 300 and/or the load sensor measurement track 310. In some implementations, a displacement coupler 206 may be coupled to a portion of the cable drum 300. It should be understood that the displacement coupler 206 may be coupled to the cable drum 300 in any way, such as by mechanical mating, adhesive, and/or screws. In some implementations, the displacement coupler may be held in position solely or substantially by being positioned between parts of the cable drum 300 and the torsion tube anchor assembly 280. In some implementations, the displacement coupler 206 may include a spring which may be coupled to a portion of the cable drum 300 and/or the torsion tube anchor assembly 280. It should be understood that the spring 206 may be coupled to the cable drum 300 in any way, including, for example, mechanical mating, adhesive, fasteners, or other ways.

In the example shown in FIG. 3, the torsion tube anchor assembly 280 may include a torsion tube anchor 208, a bearing retention ring 304, and a bearing 306. The torsion tube anchor assembly 280 includes an anchoring head 282 and an extending tube 284 through which the torsion tube 130 extends. In the implementation shown, the extending tube 284 also extends through the open hole in the cable drum 300, and the cable drum is configured to rotate relative to the torsion tube anchor assembly. It should be understood that, depending on the implementation, the torsion tube anchor assembly 280 may include only some or none of the illustrated components and any component of the torsion tube anchor assembly 280 may be structurally modified based on the configuration of the particular implementation. The torsion tube anchor assembly 280 may be fixedly coupled to the torsion tube 130 such that the torsion tube anchor assembly 280 and the torsion tube 130 rotate with the same (i.e., equal or about equal) angular displacement. For example, the anchoring head 282 of the torsion tube anchor assembly 280 may be fixedly coupled to the torsion tube 130 with set screws 320 such that the torsion tube anchor assembly 280 and the torsion tube 130 rotate with the same angular displacement. The extending tube 284 torsion tube anchor 208 may provide a surface for the cable drum 300 to rotate on relative to the torsion tube 130. In some implementations, the torsion tube anchor 208 may have an inner diameter of about 1 inch which allows the torsion tube anchor assembly 280 to slide onto the torsion tube 130. In some implementations, the displacement coupler 206 may be coupled to a portion of the torsion tube anchor 208. It should be understood that the displacement coupler 206 may be coupled to the torsion tube anchor 208 in any suitable way, including, for example, by mechanical mating, adhesive, fasteners, or other ways. In some implementations, the displacement coupler 206 may be a spring which may be coupled to a portion of the torsion tube anchor 208. It should be understood that the spring may be coupled to the torsion tube anchor 208 in any suitable way, including, for example, mechanical mating, adhesive, fasteners, or other ways.

In some implementations, a portion of the torsion tube anchor may engage with a portion of the cable drum 300 to create a mechanical limit 318 which may set a maximum value on the angular displacement between the torsion tube anchor 208 and the cable drum 300 in at least one direction. In the example shown in FIG. 3, the mechanical limit may include a protrusion 319*b* extending from the torsion tube anchor 208 and a protrusion 319*a* extending from the cable drum 300. The protrusions 319*a*, 319*b* may engage with or abut against each other (such as by physical or mechanical interference) at a specific point in rotation and prevent further angular displacement between the torsion tube anchor 208 and the cable drum 300. The bearing 306 may slide over and couple with the torsion tube anchor 208. In some implementations, the bearing 306 may also be referred to as a sleeve bearing. In some implementations, the bearing 306 may provide a surface for the cable drum 300 to rotate on such that the cable drum 300 may be enabled to change angular displacement relative to the torsion tube 130. In some implementations, the bearing 306 may be lubricated to reduce the friction between the bearing 306 and the cable drum 300 and/or the torsion bar anchor. The bearing retention ring 304 may be placed at one side of the bearing 306. In some implementations, the bearing retention ring 304 may also be referred to as a sleeve bearing retention ring. In some implementations, the bearing retention ring 304 may hold the bearing 306 on the torsion tube anchor 208 on at least one side. In some implementations, the bearing retention ring 304 may cause the bearing retention ring 304 and the bearing 306 to rotate with the same angular displacement as the torsion tube anchor 208.

The displacement coupler 206 may couple with the torsion tube anchor assembly 280 and the cable drum 300. In the example shown in FIG. 3, the displacement coupler 206 is a spring, and the displacement coupler 206 rests on the torsion tube anchor 208 and may couple with a protrusion on the torsion tube anchor 208 and a protrusion on the cable drum 300. However, it should be understood that the displacement coupler 206 may have any shape, size, and/or form which may provide a biasing force against the cable 308. For example, the displacement coupler 206 may include at least one spring, a compression spring in combination with a lead screw, magnetic plates, and/or any other mechanism for providing an opposing force. In some implementations, the displacement coupler 206 may be a right-hand wound torsion spring. It should further be understood that the displacement coupler 206 may couple the torsion tube anchor and/or the cable drum 300 and the displacement coupler 206 may couple with any portion of the torsion tube anchor and/or the cable drum 300 together. It should be understood that the displacement coupler 206 may be coupled to the cable drum 300 in any way, such as by mechanical mating, adhesive, and/or screws. When the movable barrier 190 becomes obstructed, jams, tilts, and/or dislodges, the taut cable 308 may stop moving and may exert an upward force on the cable drum 300 driving the cable drum 300 to rotate in the second direction. However, the wound displacement coupler 206 may exert an opposing force opposing the rotation of the cable drum 300 in the second direction. Thus, the wound displacement coupler 206 may be considered to have a reserve spooling effect. The force exerted on the cable drum 300 may equally oppose the upward force exerted by the cable 308 thus causing the cable drum 300 to cease rotation. In some implementations, about 1 to 5 pounds of force may be exerted by the displacement coupler 206 on the cable drum 300. In some implementations, only about 2 pounds of force may be exerted by the displacement coupler 206 on the cable drum 300. If the cable drum 300 stops rotation, the torsion tube 130 may continue to rotate causing angular displacement between the cable drum 300 and the torsion tube 130.

When the movable barrier 190 is closing, a downward force on the cable 308 may cause the displacement coupler 206 to wind and exert a biasing force on the cable drum 300. If the movable barrier subsequently becomes obstructed, jams, tilts, or dislodges and the cable stops exerting the downward force, the cable drum 300 will stop or slow rotation. When the torsion tube 130 continues to rotate while the cable drum 300 stops rotation, the displacement coupler 206 may exert a force on the cable drum 300 to prevent the cable 308 from going slack due to the stopped rotation of the cable drum 300. A taut cable 308 may exert a force on the cable drum 300 if the movable barrier 190 stops moving downwardly. The displacement coupler 206 may unwind and provide a force on the cable drum 300 to counter the force of the taut cable 308 on the cable drum 300. In some implementations, the force exerted on the cable drum 300 by the displacement coupler 206 may be about 2 pounds.

In the example shown in FIG. 3, cable drum assembly 132 includes a load sensor measurement track 310, a load sensor 312, a displacement measurement track 314, and a displacement sensor 316. The sensor configuration may allow the movable barrier system 100 to self-detect a slack cable such that no external sensor and/or feedback may be necessary.

In some implementations, the load sensor measurement track 310 and load sensor 312 may measure the tension force of the cable 308 on the cable drum 300. In some implementations, when the tension force applied on the cable drum 300 by the cable 308 increases to a threshold value, the load sensor 312 may send a signal to stop rotation of the torsion tube 130. In some implementations, when the tension force applied on the cable drum 300 by the cable 308 increases to a threshold value, the load sensor 312 may send a signal to a controller (not shown in FIG. 3 but discussed further herein) to stop rotation of the torsion tube 130. In some implementations, the controller may cause the motor of the barrier operator 134 to stop rotation of the torsion tube 130 in response to the signal. It should be understood that, depending on the implementation, the load sensor may be positioned on different parts of the movable barrier system 100, such as the cable drum 300, the cable 308, the torsion tube anchor assembly 280, and/or the displacement coupler 206. In some implementations, the load sensor may be a strain gage that may measure the strain of the part on which the load sensor 312 is located. In some implementations, the load sensor 312 may determine discrete or continuous measurements which may be converted to data relating to the force applied by the cable 308 such that the barrier operator 134 may dynamically adjust configuration parameters of torsion tube's 130 rotation such as velocity and acceleration. In some implementations, data relating to the force applied by the cable 308 may be stored in a memory.

In some implementations, a displacement measurement track 314 and a displacement sensor 316 may be positioned to measure the angular displacement between the cable drum 300 and the torsion tube anchor 208. In the example shown in FIG. 3, the displacement sensor 316 is positioned on a portion of the displacement measurement track 314 such that when the displacement measurement track aligns with a portion of the torsion tube anchor 208 corresponding to a desired angular displacement threshold, the displacement sensor 316 may be triggered and may send a signal. In some implementations, a portion of the displacement measurement track 314 not including the displacement sensor 316 may be non-conductive, while the displacement sensor 316 or a portion of the track 314 near the sensor 316 may be conductive. In some implementations, the torsion tube anchor 208 may include a conductive member (not shown) which may engage with the conductive displacement sensor 316 causing the displacement sensor 316 to send a signal. In some implementations, when the displacement sensor 316 is activated, the displacement sensor 316 may send a signal to stop the torsion tube 130 from rotating. In some implementations, when the displacement sensor 316 is activated, the displacement sensor 316 may send a signal to the controller to stop the torsion tube 130 from rotating. In some implementations, the controller may be integrated with the barrier operator 134 and may cause the motor to stop rotating the torsion tube 130 in response to the signal. In some implementations, the displacement measurement track may be partially conductive such that it creates a binary measurement (e.g., conductive/non-conductive) when a given angular displacement value is reached. In some implementations, the displacement measurement track may be resistive such that the displacement sensor 316 determines an analog angular displacement measurement. In some implementations, the displacement measurement track may include more than one conductive portion such that the sensor may output discrete or continuous measurements that may be converted to data points communicated in at least one signal corresponding to more than one angular displacement value. In some implementations, one or more than one angular displacement values may be stored in a memory (not shown in FIG. 3 but discussed further herein). It should be understood that, in some implementations, the displacement sensor may be positioned relative to the cable drum 300 and/or the torsion tube anchor assembly 280 or the torsion tube 130 such that a specific angular displacement will cause the sensor to send a signal even if the sensor does not measure an angular displacement value. For example, a microswitch may be positioned a specific angular displacement away from a cam such that the microswitch may be activated when that angular displacement is reached and may send a binary signal to the controller. In some implementations a sensor may send an initial signal to indicate that the movable barrier system is operating properly (e.g., the angular displacement between the cable drum and torsion bar and/or tension force is not greater than the threshold value) and/or that the motor should continue running and rotating the torsion tube 130. In some implementations, activating a sensor may cause the sensor to stop the initial signal indicating to stop rotation of the torsion tube 130. In some implementations, the initial signal may be monitored continuously or at intervals for any loss of signal connection, and the controller may stop the motor and/or send an alert in response to a loss of signal connection. Thus, in some implementations, the controller may be configured to stop the motor in response to input from a sensor or a loss of connection.

It should be understood that the displacement measurement track 314 and displacement sensor 316 may be interchangeable with any type of sensor configuration. In some implementations, any sensor configuration may be used with the cable drum assembly 132 as long as the sensor configuration may determine the angular displacement between the cable drum 300 and the torsion tube anchor 208. In some implementations, the displacement sensor may be positioned on the torsion tube anchor 208 and may be positioned such that when the displacement measurement track 314 on the cable drum 300 rotates to a position corresponding to a threshold value of angular displacement, a conductive portion of the displacement measurement track 314 may activate the displacement sensor causing the displacement sensor to send a signal to stop rotation of the torsion tube. It should be understood that, in some implementations, the displacement sensor and the displacement measurement track may swap positions such that the displacement sensor may be positioned on the cable drum 300 and the measurement track may be positioned on the torsion tube anchor assembly 280, and the resulting sensor layout may still perform the same functions.

In some implementations, a microswitch or switch may be positioned on the torsion tube anchor assembly 280 and a cam profile may be positioned on the cable drum 300. The cam profile may actuate the microswitch or switch when the angular displacement between the cable drum 300 and the torsion tube anchor 208 corresponds to a threshold value causing the microswitch to send a signal to stop rotation of the torsion tube 130. It should be understood that, in some implementations, the microswitch and the cam profile may swap positions such that the microswitch may be positioned on the cable drum 300 and the cam profile may be positioned on the torsion tube anchor assembly 280, and the resulting sensor layout may still perform the same functions.

In some implementations, an opto-interrupter may be positioned on the torsion tube anchor assembly 280 and an interrupting member may be positioned on the cable drum 300. The interrupting member may engage the opto-interrupter when the angular displacement between the cable drum 300 and the torsion tube anchor 208 corresponds to a threshold value causing the opto-interrupter to send a signal to stop rotation of the torsion tube 130. It should be understood that, in some implementations, the opto-interrupter and the interrupting member may swap positions such that the opto-interrupter may be positioned on the cable drum 300 and the interrupting member may be positioned on the torsion tube anchor assembly 280, and the resulting sensor layout may still perform the same functions. In some implementations, a light-emitting diode (LED) and photo-sensor may be positioned on the torsion tube anchor assembly 280 and an optical encoder disk may be positioned on the cable drum 300. The optical encoder disk may selectively disrupt an optical signal between the LED and photo-sensor indicating the angular displacement between the cable drum 300 and the torsion tube anchor 208 causing the photosensor to send at least one signal to stop rotation of the torsion tube 130. In some implementations, the optical encoder disk may include more than one slot such that the sensor may output discrete data points in at least one signal corresponding to more than one angular displacement value. In some implementations, one or more than one angular displacement value may be stored in a memory. It should be understood that, in some implementations, the LED, photosensor pairing, and the optical encoder disk may change positions such that the LED and photo-senser may be positioned on the cable drum 300 and the optical encoder disk may be positioned on the torsion tube anchor assembly 280, and the resulting sensor layout may still perform the same functions. It should be understood that the sensor configuration depicted in FIG. 3 may be interchangeable with any type and/or configuration of sensors capable of detecting angular displacement and/or force measurement.

The displacement sensor 316, the load sensor 312, and/or any other sensor described herein may transmit signals to the controller, the barrier operator 134, or the motor using any type of signal transmission such as mechanical brushes, a radiofrequency (RF) transmission, optical modulated light (e.g., from an LED to a photo-sensor), a slip ring, and/or an electromagnetic signal. For example, in some implementations, a mechanical brush attached to a sensor positioned on the cable drum 300 or the torsion tube anchor assembly 280 may be positioned such that at some point in the rotation of the cable drum 300 or the torsion tube anchor assembly 280 the mechanical brush contacts and transfers a signal to another stationary mechanical brush which then relays the signal to the controller. For another example, in some implementations, a sensor may send a signal by RF transmission or any other type of signal transmission to the controller. For another example, in some implementations, an LED attached to a sensor may send a signal by emitting optical modulated light to a photo-sensor which may then relay the signal to the controller. For another example, in some implementations, a portion of a slip ring or liquid-metal slip ring attached to a sensor positioned on the cable drum 300 or the torsion tube anchor assembly 280 may be positioned such that despite the rotation of the cable drum 300 or the torsion tube anchor assembly 280 the portion of the slip ring contacts and transfers a signal to another stationary portion of the slip ring which then relays the signal to the controller. For another example, in some implementations, a portion of a rotary transformer attached to a sensor positioned on the cable drum 300 or the torsion tube anchor assembly 280 may be positioned such that despite the rotation of the cable drum 300 or the torsion tube anchor assembly 280 the portion of the rotary transformer contacts and transfers a signal by electromagnetic transmission to another stationary portion of the rotary transformer which then relays the signal to the controller.

The displacement sensor 316, the load sensor 312, and/or any other sensor described herein may be powered by any type of power source such as mechanical brushes, batteries, and/or batteries with magnetic charging. For example, in some implementations, a mechanical brush attached to a sensor positioned on the cable drum 300 or the torsion tube anchor assembly 280 may be positioned such that at some point in the rotation of the cable drum 300 or the torsion tube anchor assembly 280 the mechanical brush contacts and receives power from another stationary mechanical brush connected to any type of power source. For another example, in some implementations, a battery attached to a sensor positioned on the cable drum 300 or the torsion tube anchor assembly 280 may be positioned such that at some point in the rotation of the cable drum 300 or the torsion tube anchor assembly 280 the battery comes close to or contacts a stationary magnet and receives power from the stationary magnet which may be connected to any type of power source.

In the example shown in FIG. 3, the mechanical limit 318 may include a protrusion 319*a* extending from the cable drum 300 and a protrusion 319*b* extending from the torsion tube anchor 208. In some implementations, the protrusion 319*a* extending from the cable drum 300 and the protrusion 319*b* extending from the torsion tube anchor 208 may engage such that the angular displacement between the cable drum 300 and the torsion tube anchor 208 must be less than a maximum angular displacement value. When the desired maximum angular displacement value is reached, the protrusion 319*a* extending from the cable drum 300 may be prevented from rotating further in a first direction in response to contacting with the protrusion 319*b* extending from the torsion tube anchor 208. Thus, the mechanical limit 318 limits the angular displacement between the cable drum 300 and the torsion tube anchor to a maximum value. In some implementations, the mechanical limit 318 may limit the maximum angular displacement to between 0 and 360 degrees. In some implementations, the mechanical limit 318 may limit the maximum angular displacement to between 0 and 90 degrees. In some implementations, the mechanical limit 318 may limit the maximum angular displacement to between 0 and 45 degrees. It should be understood that the mechanical limit 318 may be interchangeable with any other type of mechanism which may limit the angular displacement between the cable drum 300 and the torsion tube anchor 208. For example, in some implementations, the mechanical limit 318 may be referred to as a set of stop bars and/or tabs. Furthermore, the type of mechanism used for the mechanical limit 318 may be determined by the type and strength of materials used in the movable barrier system 100.

At least one set screw 320 may be positioned to secure the torsion tube anchor assembly 280 to the torsion tube 130 such that the torsion tube anchor assembly 280 and the torsion tube 130 rotate with the same angular displacement. At least one set screw may be inserted into a portion of the torsion tube anchor assembly 280 and secured to the torsion tube 130. In the example shown in FIG. 3, two set screws 320 may be inserted into the torsion tube anchor 208 and secured to the torsion tube 130.

In some implementations, a bearing plate 204 may be positioned on an end of the torsion tube 130 proximal and/or coupled with the cable drum assembly 132. In some implementations, the bearing plate 204 may prevent the cable drum 300 from rotating off the torsion tube anchor 208 and/or the torsion tube 130.

Figure 4:
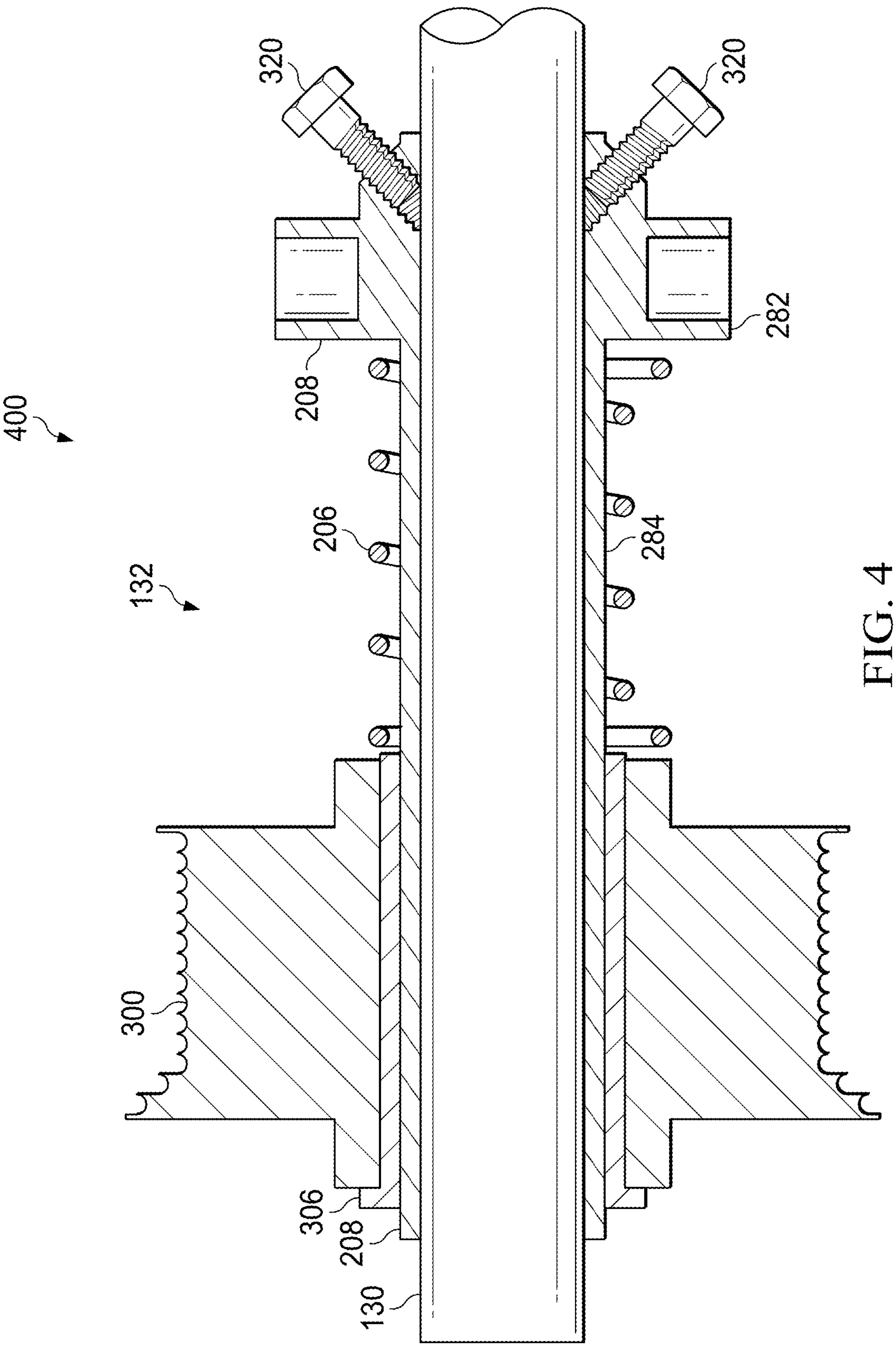
FIG. 4 is a cross-section view of a cable drum assembly, according to some aspects of the present disclosure.

FIG. 4 is a cross-section view 400 of a cable drum assembly 132, according to some aspects of the present disclosure. That is, FIG. 4 illustrates a vertical lengthwise cross-section of the cable drum assembly 132 of FIG. 3. The torsion tube 130 may extend through the center of the cable drum assembly 132. The torsion tube anchor may extend through the center of the bearing 306 and the cable drum 300. The bearing 306 may extend though the center of the cable drum 300. Thus, in some implementations, the cable drum 300 may have a relatively large inner diameter to be mounted on the torsion tube anchor 208 and the bearing 306. In some implementations, a lip on the bearing 306 may prevent the cable drum 300 from rotating off the torsion tube anchor assembly 280.

Figure 5:
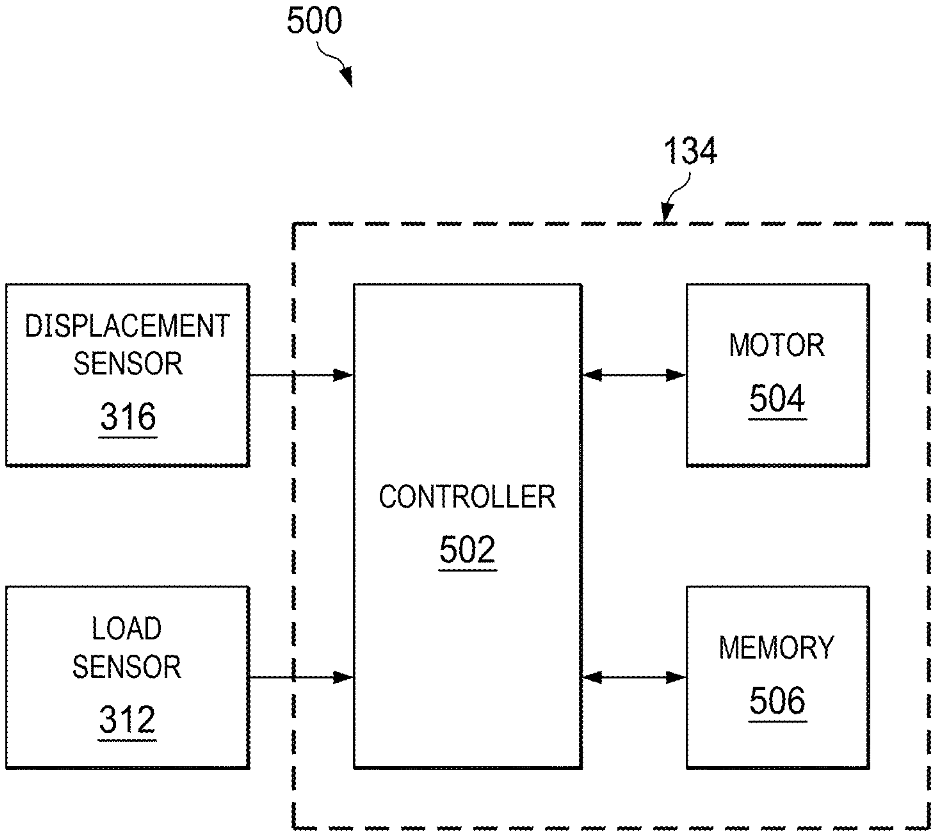
FIG. 5 illustrates an example block diagram of a movable barrier operator system, according to some aspects of the present disclosure.

FIG. 5 illustrates an example block diagram of a barrier operator system 500, according to some aspects of the present disclosure. The barrier operator system 500 may include some or all of at least one displacement sensor 316, at least one load sensor 312, and a barrier operator 134. The barrier operator 134 may include some or all of a controller 502, a motor 504, and/or a memory 506. The displacement sensor 316 and the load sensor 312 may transmit at least one signal to the controller 502 using any type of signal transmission such as wires, mechanical brushes, a radiofrequency (RF) transmission, optical modulated light (e.g., from an LED to a photo-sensor), a slip ring, and/or an electromagnetic signal. The controller 502 may start and stop operation of the motor 504. In some implementations, the motor 504 may rotate the torsion tube 130 in a first direction and/or a second direction of rotation. Thus, when the displacement sensor 316 and/or the load sensor 312 transmit a signal to the controller 502, the controller may stop or start rotation of the torsion tube 130 by the motor 504. In some implementations, the movable barrier system may not include a controller 502, and the displacement sensor 316 and the load sensor 312 may communicate directly with the motor 504. In some implementations, the controller 502 may store any data transmitted from any sensor in a memory 506. In some implementations, any displacement sensor 316 and any load sensor 312 may store data in the memory 506. In some implementations, since the sensors may provide feedback relating to the tension on the cable 308, the motor 504 may be configured to run with minimal feedback relating to the rotation of the torsion tube 130. However, in some implementations, the controller 502 may assess parameters relating to the motor 504, such as power, velocity, acceleration, and/or rotations per minute (RPM), when determining rotation power and speed.

Figure 6:
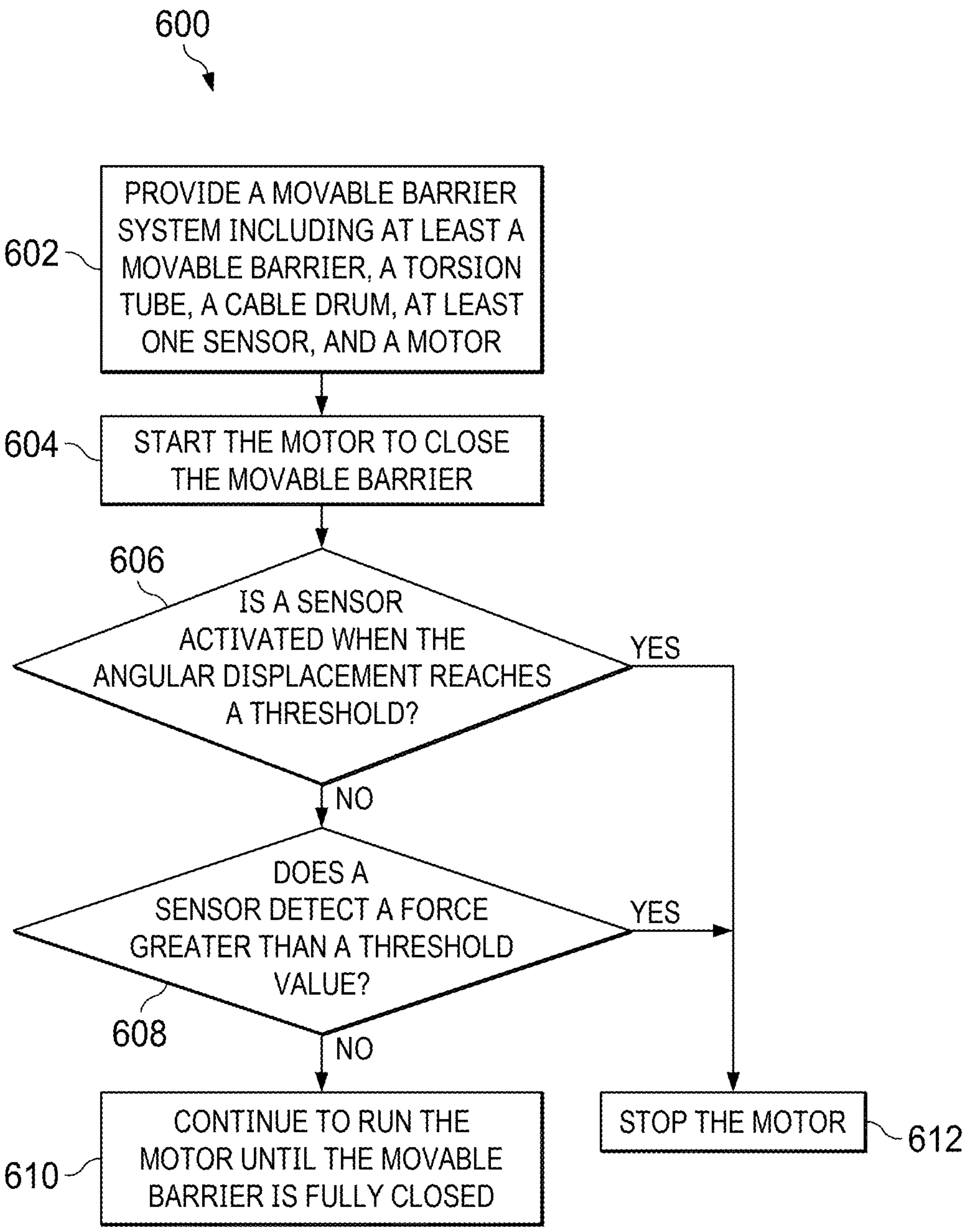
FIG. 6 illustrates an example method to detect a slack cable in a movable barrier system, according to some aspects of the present disclosure.

FIG. 6 illustrates an example method 600 to detect a slack cable in a movable barrier system 100, according to some aspects of the present disclosure. At process 602, a movable barrier system 100 may be provided including at least a movable barrier 190, a torsion tube 130, a cable drum 300, at least one sensor, and a motor 504. At process 604, the motor 504 may start to close the movable barrier 190 by rotating the torsion tube 130 in the first direction. As the movable barrier 190 closes, the weight of the movable barrier 190 pulls downwardly on the cable 308 causing the cable drum 300 to rotate at a greater angular velocity than the torsion tube 130. As the cable drum 300 continues to rotate at a greater angular velocity, the displacement coupler 206 stores potential energy. The cable drum 300 may continue to rotate at a greater angular velocity until the mechanical limit 318 is reached. Once the mechanical limit is reached, the cable drum may rotate at the same angular velocity as the torsion tube 130. When the movable barrier 190 becomes obstructed, jams, tilts, and/or dislodges, the taut cable 308 stops moving and exerts an upward opposing force against the cable drum's 300 rotation causing the cable drum 300 to slow or stop rotation. If the cable drum 300 stops rotation, the torsion tube 130 may continue to rotate causing angular displacement between the cable drum 300 and the torsion tube 130.

At process 606, if the angular displacement reaches a threshold value, a displacement sensor 316 may send a signal to the controller 502 to stop the motor 504 and/or stop rotation of the torsion tube 130.

At optional process 608, if the force exerted on the cable drum 300 by the cable is greater than a threshold value, a load sensor 312 may indicate to the controller 502 to stop the motor 504 and/or stop rotation of the torsion tube 130. In some implementations, the load sensor 312 may be positioned on the cable drum 300 such that it may determine the force exerted on the cable drum 300 by the cable 308.

If the displacement sensor 316 and the load sensor 312 are not activated, the method 600 may proceed to process 610 and the motor 504 may continue to close the movable barrier 190 until the movable barrier 190 is fully closed. Process 610 will generally occur under normal operation of the movable barrier system 100. In some implementations, the movable barrier system 100 may recognize the close limit of the movable barrier 190 such that when the movable barrier 190 resists moving downward after contact with the floor 112, the increase in the angular displacement between the cable drum 300 and the torsion tube 130 triggers the displacement sensor 316 to stop motor 504.

If in processes 606 and/or 608, the displacement sensor 316 and/or the load sensor 312 are activated, the method 600 may proceed to process 612 and stop the motor 504 and/or stop rotation of the torsion tube 130. In some implementations, the motor 504 may remain stopped indefinitely or for a period of time to allow for troubleshooting of issues relating to the stoppage. In some implementations, the motor 504 may reverse the rotation of the torsion tube 130 to reopen the movable barrier 190.

It should be appreciated that any of the processes of method 600 may be completed in any order. It should also be appreciated that some or all optional steps may be completed depending on the implementation. The order of the steps in method 600 may be changed indiscriminately as the movable barrier system 100 closes a movable barrier 190.

Figure 7:
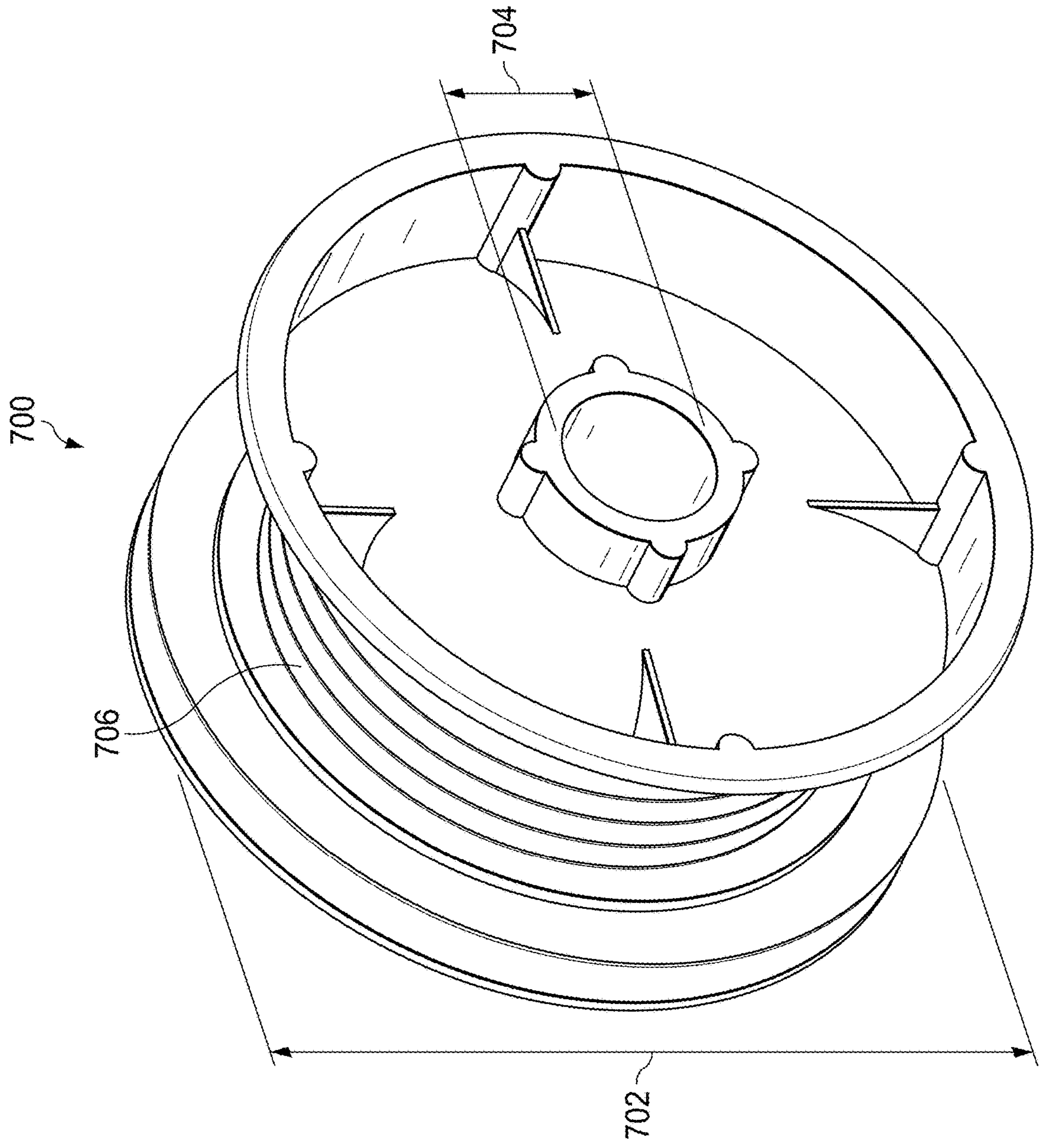
FIG. 7 is a perspective view of a cable drum, according to some aspects of the present disclosure.

FIG. 7 is a perspective view of a cable drum 700, according to some aspects of the present disclosure. The cable drum 700 may be an example of a standard-lift cable drum. The cable drum 700 may have an outer diameter 702 and an inner diameter 704. Depending on the implementation, the cable drum used in the cable drum assembly 132 may have an outer diameter 702 of any size. In some implementations, the cable drum used in the cable drum assembly 132 may have an outer diameter 702 of 4 to 4.5 inches. In some implementations, the cable drum used in the cable drum assembly 132 may have a larger inner diameter 704 than many standard-lift drums because the cable drum may need to slide over the torsion tube anchor assembly 280. The cable drum 700 may also include cable grooves 706. The cable grooves 706 may allow a cable 308 to more effectively spool around the cable drum 700.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A movable barrier system for operating a movable barrier comprising:

- a torsion tube configured to rotate;
- a cable drum on the torsion tube, the cable drum configured to rotate relative to the torsion tube;
- a cable disposed on the cable drum and configured to connect to the movable barrier;
- a sensor which detects an angular displacement between the rotation of the torsion tube and the rotation of the cable drum or a force between the torsion tube and the cable drum and sends a signal when the angular displacement or the force changes; and
- a controller in communication with the sensor and configured to stop rotation of the torsion tube in response to the signal.

2. The movable barrier system of claim 1, wherein the sensor is configured to detect the angular displacement and configured to send the signal when the angular displacement exceeds a threshold.

3. The movable barrier system of claim 1, further comprising an anchor assembly and a displacement coupler, the anchor assembly comprising an anchor and a bearing, the anchor being coupled to the torsion tube in a manner that the anchor, the bearing, and the torsion tube rotate with an about equal angular velocity, and the displacement coupler configured to oppose rotation of the cable drum when the cable drum rotates relative to the anchor, the bearing, and the torsion tube.

4. The movable barrier system of claim 2, wherein the sensor is configured to send an initial signal to the controller to rotate the torsion tube, the initial signal being transmitted from the sensor to the controller unless the angular displacement exceeds the threshold.

5. The movable barrier system of claim 1, wherein the signal is further configured to communicate at least one angular displacement value to the controller.

6. The movable barrier system of claim 3, further comprising a track, the track being coupled to the cable drum in a manner that the track rotates with an about equal angular velocity as the cable drum, and the sensor configured to determine the angular displacement based on a position of the sensor and the track.

7. A movable barrier system for operating a movable barrier comprising:

a torsion tube configured to rotate in a first direction;

a cable drum on the torsion tube, the cable drum configured to rotate in the first direction and a second direction and configured to rotate relative to the torsion tube in a manner that changes an angular displacement between the torsion tube and the cable drum;

a cable disposed on the cable drum and configured to connect to the movable barrier;

a displacement coupler configured to oppose rotation of the cable drum in the second direction when the cable drum rotates relative to the torsion tube; and a sensor which communicates a signal to a controller when the angular displacement between the rotation of the torsion tube and the rotation of the cable drum or a force between the torsion tube and the cable drum changes.

8. The movable barrier system of claim 7, further comprising a mechanical limit configured to cause the cable drum to rotate in the first direction with an about equal angular displacement as the torsion tube.

9. The movable barrier system of claim 7, further comprising an anchor assembly, the anchor assembly comprising an anchor and a bearing, the anchor being coupled to the torsion tube in a manner that the anchor, the bearing, and the torsion tube rotate with an about equal angular velocity, the bearing being configured to allow the cable drum to rotate in the second direction.

10. The movable barrier system of claim 7, wherein the sensor is configured to communicate the signal when the angular displacement exceeds a threshold.

11. The movable barrier system of claim 9, wherein the displacement coupler further comprises a spring coupled to the cable drum and the anchor assembly.

12. The movable barrier system of claim 7, further comprising a motor configured to cause the torsion tube to rotate in the first direction.

13. The movable barrier system of claim 9, further comprising at least one set screw securing the anchor to the torsion tube.

14. A method for operating a movable barrier in a movable barrier system, the method comprising:

providing a torsion tube and a cable drum, the cable drum being positionable on the torsion tube;

rotating the torsion tube and the cable drum in a first direction with an about equal angular velocity;

allowing the angular velocity of the cable drum to decrease in a manner that an angular displacement between the rotation of the torsion tube and the rotation of the cable drum increases; and selectively communicating a signal from a sensor to a controller to stop movement of the movable barrier when the angular displacement reaches a threshold.

15. The method of claim 14, further comprising;

determining the angular displacement with the sensor; and communicating the signal with the sensor when the angular displacement reaches the threshold.

16. The method of claim 14, further comprising:

providing an anchor assembly and a displacement coupler, the anchor assembly comprising an anchor and a bearing;

coupling the anchor to the torsion tube in a manner that the anchor, the bearing, and the torsion tube rotate with an about equal angular velocity; and coupling the displacement coupler to the cable drum and the anchor in a manner that the displacement coupler is configured to oppose rotation of the cable drum in a second direction when the cable drum rotates relative to the torsion tube, the second direction being opposite the first direction.

17. The method of claim 15, further comprising communicating an initial signal from the sensor to the controller to rotate the torsion tube, the initial signal being transmitted from the sensor to the controller unless the angular displacement reaches the threshold.

18. The method of claim 14, further comprising communicating with the signal at least one angular displacement value to the controller.

19. The method of claim 14, further comprising:

providing an anchor assembly comprising an anchor and a bearing, the anchor being coupled to the torsion tube in a manner that the anchor, the bearing, and the torsion tube rotate with an about equal angular velocity;

coupling a track to the cable drum in a manner that the track rotates with an about equal angular velocity as the cable drum; and configuring the sensor to determine the angular displacement based on a position of the sensor and the track.

20. The movable barrier system of claim 1, wherein the sensor is positioned on the cable drum and is configured to send the signal, the signal indicating the cable drum is rotating at a different angular velocity than the torsion tube.

* * * * *